United States Patent [19]

Mestayer et al.

[11] 4,196,495
[45] Apr. 8, 1980

[54] CRAWFISH TAIL PEELER

[76] Inventors: John L. Mestayer, 99 Louise; Edward S. Miller, III, P.O. Box 187; Harry P. Monnin, 5001 Old Jeanerette Rd., all of Jeanerette, La. 70544

[21] Appl. No.: 902,886

[22] Filed: May 4, 1978

[51] Int. Cl.$^2$ ............................................. A22C 29/02
[52] U.S. Cl. ...................................................... 17/73
[58] Field of Search .......................... 17/69, 71, 72, 73

[56] References Cited

U.S. PATENT DOCUMENTS

| | | | |
|---|---|---|---|
| 2,660,754 | 12/1953 | Roshko | 17/73 |
| 2,987,759 | 6/1961 | Lapeyre et al. | 17/73 |
| 4,008,508 | 2/1977 | LaPine et al. | 17/71 X |

*Primary Examiner*—Willie G. Abercrombie
*Attorney, Agent, or Firm*—Clarence A. O'Brien; Harvey B. Jacobson

[57] ABSTRACT

Apparatus for separating edible tail portions of crawfish and similar crustaceans from exoskeletal portions thereof, the present invention comprises a first roller having a concave lateral peripheral edge surface which is opposed at a substantially constant spacing by a convex lateral peripheral edge surface of a second roller, the rollers being rotated in opposite senses to receive the exoskeletal portions of the crawfish between the opposing peripheral edge surfaces of the rollers. Rear margins of the flippers of the crawfish are grasped between the counter rotating rollers, the exoskeletal portions covering the tail being pulled between the rollers to peel said exoskeletal portions from the edible portions and to simultaneously devein the crawfish tail.

7 Claims, 6 Drawing Figures

U.S. Patent   Apr. 8, 1980   Sheet 1 of 2   4,196,495
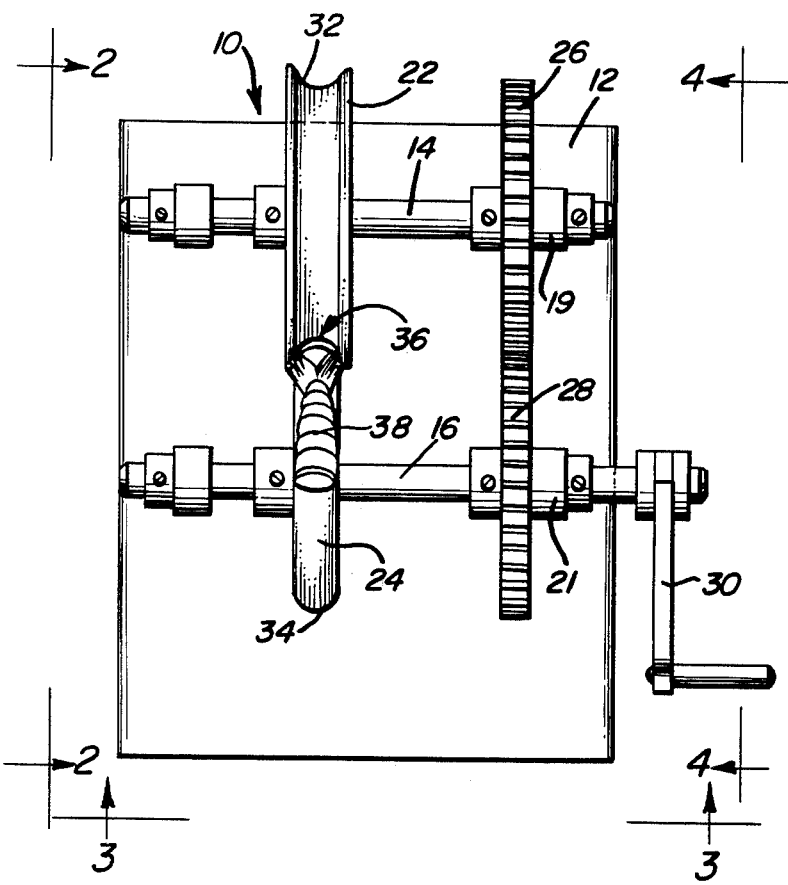
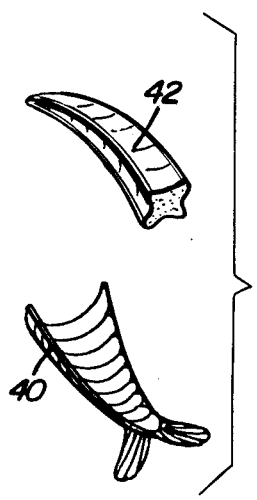
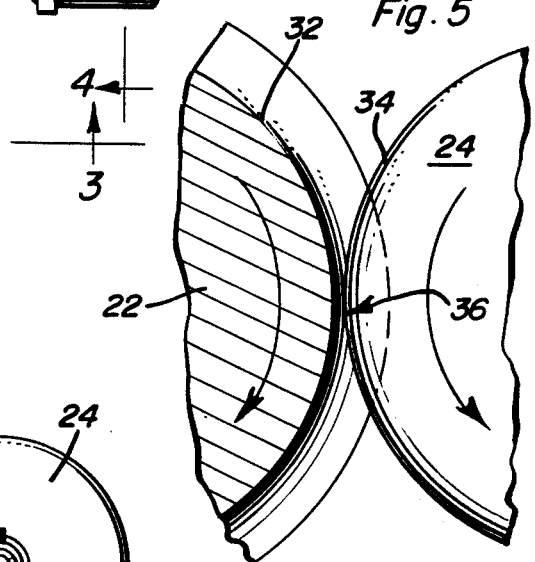
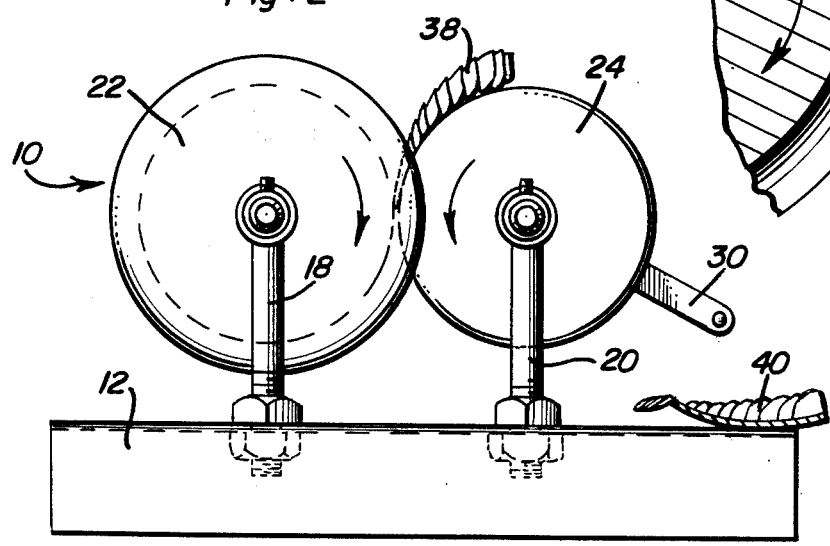

CRAWFISH TAIL PEELER

BACKGROUND OF THE INVENTION

1. Field of the Invention

The invention relates generally to an apparatus for separating exoskeletal portions of crustaceans such as crawfish and the like from edible portions thereof, the invention particularly relating to apparatus for peeling and simultaneously deveining crawfish and similar crustaceans.

2. Description of the Prior Art

Apparatus capable of removing exoskeletal portions of crustanceans from edible portions thereof, particularly from edible tails of crustaceans such as crawfish and the like, have long been the subject of intensive developmental efforts. However, no effective crawfish "peeling" apparatus has heretofore been developed. Prior devices have included counter-rotating roller members between which deheaded crawfish are fed tail first, the roller members drawing the exoskeletal portions therebetween and essentially extruding the edible tail out of the open portion of the exoskeleton which results on deheading of the crawfish. Such devices have an undesirable tendency to also draw the edible portions of the tail between the roller members, thereby substantially mutilating said edible portions. For this and possibly other reasons, previously known devices are not being used commercially.

One example of a prior crawfish peeling machine is disclosed in U.S. Pat. No. 2,660,754, to Roshko, this machine having a pair of opposed counter-rotating rollers which squeeze the edible portions of a deheaded crawfish tail out of the exoskeletal portions. The rollers have flat opposing peripheral surfaces, a jet of water being utilized in an effort to prevent the separated edible tail from following the exoskeletal hull through the rollers. The jet of water is intended to deflect or "wash" the edible tail away from the rollers before the meat is grasped therebetween and mutilated due to passage between the rollers.

Lapeyre et al, in U.S. Pat. No. 2,987,759, disclose a crawfish peeling apparatus wherein a plurality of crawfish are carried between opposed counter-rotating rollers by a conveyor belt which is carried by one of the rollers. Deheaded crawfish are disposed in rows on the belt immediately preceding apertures in the belt and are fed tail first between the rollers. The exoskeletal portions are caught between the wheels and pulled therebetween, the edible tail portions being essentially extruded from the exoskeletal portions due to the pressure of the rollers and subsequently falling through the apertures in the belt and onto collecting trays. The mechanical operation of separating the exoskeletal portions of the crawfish from the edible tails is essentially identical to that descirbed by Roshko.

The present invention provides apparatus particularly having opposed counter-rotating rollers which peel exoskeletal portions of a deheaded crawfish from edible tail portions thereof, one of the rollers having a concave peripheral edge surface and the other of the rollers having a mating convex peripheral edge surface. The shaped peeling surfaces act to substantially decrease the potential for mutilating the edible tail portions due to slippage of the tail portions between the rollers.

SUMMARY OF THE INVENTION

The present invention provides apparatus for separating edible tail portions of crawfish and similar crustaceans from exoskeletal portions thereof, the present apparatus particularly being useful for peeling surmounting exoskeletal portions of a deheaded crawfish from edible tail portions thereof. The present apparatus essentially comprises co-planar counter-rotating roller members, a first roller member having a concave peripheral edge surface which is opposed at a substantially constant spacing by a convex edge surface of a second roller member. The roller members of the present invention are rotated in opposite senses, the convex edge surface of the second roller member being essentially received into the peripheral open channel formed by the concave edge surface of the first roller member. Deheaded crawfish fed tail-first between the counter-rotating roller members are peeled and deveined, rear margins of the flippers of the crawfish being grasped between the counter-rotating roller members and the exoskeletal portions covering the tail pulled between said roller members. The edible tail portion of the crawfish is essentially extruded from the covering exoskeletal portion, the edible tail portion being simultaneously deveined by the counter-rotating roller members.

Deheaded crawfish of any commercially marketable size and maturity may be peeled by the apparatus of the present invention, the crawfish being peelable either in a raw, scalded, or fully cooked condition. In order to most effectively utilize the present apparatus, the head and abdominal portions of the crawfish or similar crustaceans are removed to provide what is commonly referred to as a "deheaded" crawfish, that is, an edible tail portion of the crawfish covered by exoskeletal portions or a "tail shell".

The concave edge portion of the first roller member is essentially shaped in cross section to conform to the substantially semi-circular shape of a crawfish tail as viewed in cross section. Since the concave edge of the first roller member is essentially congruent with the cross-sectional shape of the crawfish tail itself and since the convex edge of the second roller wheel fits substantially into the confines of the concavity defined by said edge of the first roller wheel member and is spaced adjustably therefrom with a gap of substantially 1/32nd of a inch, rear portions of the tail shell are readily grasped between the roller members and pulled between the counter-rotating roller members. The counter-rotating roller members of the invention pull the tail shell between said roller members and simultaneously devein the edible portion of the deheaded crawfish, said edible portion being removed from the exoskeletal portions by the peeling action of the roller members. The tail shell of the deheaded crawfish is thus peeled from the edible portion thereof without mutilation of said edible portion. In order to accommodate crawfish of differing sizes, the spacing between the two roller members is adjustable in a range at least between a ⅛ inch gap to a substantially contacting relationship between the peripheral edge surfaces of the roller members. It should be understood, however, that the lateral dimensions of the roller members as well as the spacing between peripheral concave and convex edge surfaces can vary according to the typical dimensions of the species of crustacean which to to be peeled according to the invention.

Accordingly, it is an object of the present invention to provide an apparatus for "peeling" edible tail portions of crawfish and similar crustaceans, the present apparatus removing exoskeletal portions of deheaded crawfish and the like from edible tail portions thereof.

It is another object of the present invention to provide an apparatus capable of simultaneously peeling and deveining deheaded crawfish and similar crustaceans, the apparatus comprising first and second counter-rotating roller members having mating concave and convex lateral peripheral edge surfaces, respectively, deheaded crawfish being fed tail-first between the roller members whereupon the exoskeletal portions are pulled between the roller members and the edible tail portions essentially extruded from said exoskeletal portions thereby to separate the edible tail of the crawfish from the covering exoskeletal portions thereof.

It is a further object of the present invention to provide apparatus for separating edible tail portions of crawfish and similar crustaceans from exoskeletal portions thereof, the apparatus comprising counter-rotating roller members having a predetermined spacing therebetween, said spacing being adjustable to accommodate crustaceans of differing sizes.

A still further object of the invention is to provide opposed counter-rotating roller members in a crawfish peeling apparatus, one of the roller members having a concave lateral peripheral edge surface into which a mating convex edge surface of the second roller member is disposed at a substantially constant spacing, the concave and convex peripheral edge surfaces being substantially semi-circular in cross section and substantially congruent with a section taken through a crawfish tail normal to the longitudinal axis of the body of the crawfish.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a plan view of a simplified embodiment of the invention;

FIG. 2 is an elevational view of the apparatus of FIG. 1 taken along lines 2—2 of FIG. 1;

FIG. 5 is a detail elevational view in partial section of the mating roller members of the invention; and, FIG. 6 is a perspective view of separated exoskeletal and edible tail portions of a crawfish.

DESCRIPTION OF THE PREFERRED EMBODIMENT

Figure 3:
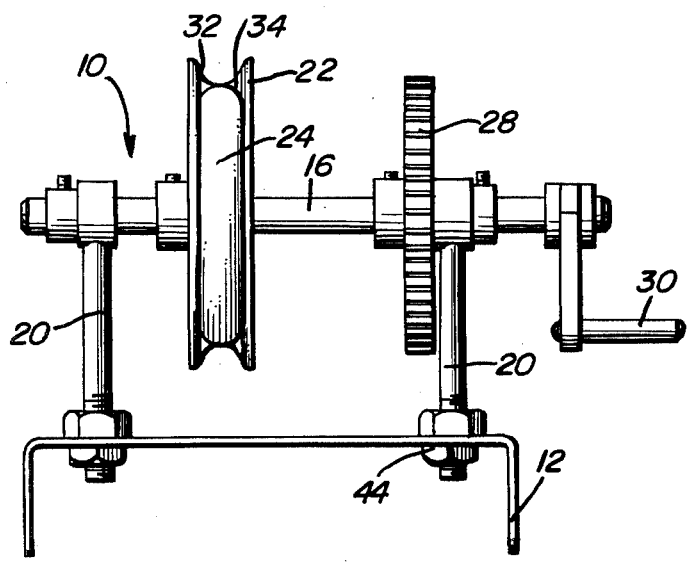
FIG. 3 is an elevational view of the apparatus of FIG. 1 as seen substantially along lines 3—3 of FIG. 1.

Referring now to the drawings and particularly to FIGS. 1-3, a simplified peeling apparatus according to the invention is shown generally at 10 to comprise a base 12 on which first and second shafts 14 and 16 are mounted for rotation respectively by supports 18 and 20. The first and second shafts 14 and 16 rotate within bearing collars 19 and 21 respectively, the bearing collars 19 and 21 being connected in a conventional manner to the supports 18 and 20 respectively.

The first shaft 14 has a concave roller member 22 mounted for rotation therewith, the roller member 22 having a concave lateral peripheral edge surface 32 formed thereabout. The first shaft 14 further has a spur gear 26 mounted for rotation thereon. The second shaft 16 similarly mounts a convex roller member 24 and a spur gear 28 for rotation therewith, the convex roller member 24 similarly having a convex lateral peripheral edge surface 34 formed thereabout.

As can particularly be seen in FIG. 1, the roller members 22 and 24 are substantially mounted in opposed, coplanar relation, the convex edge surface 34 of the convex roller member 24 extending into the concave depression formed by the surface 32 of the concave roller member 22. In effect, peripheral edge surfaces of the convex roller member 24 "fit" into or mate with concave peripheral surfaces of the concave roller member 22. In particular, the concave surface 32 opposes and is spaced at a constant spacing from the convex surface 34, a spacing at 36 as particularly seen in FIG. 5 being maintained between the roller members 22 and 24. On counter rotation of the roller members 22 and 24 as will be further described hereinafter, an operator of the apparatus 10 inserts rear marginal portions of a deheaded crawfish 38 between the counter-rotating roller members 22 and 24. Exoskeletal portions of the deheaded crawfish 38 are thereby grasped between the surfaces 32 and 34 of the roller members 22 and 24 and are pulled therebetween, an edible tail portion 42 being extruded from a tail shell 40 by the compressive action of the roller members 22 and 24. The tail shell 40 and the edible tail portion 42 of the deheaded crawfish 38 can particularly be seen in FIG. 6.

Figure 4:
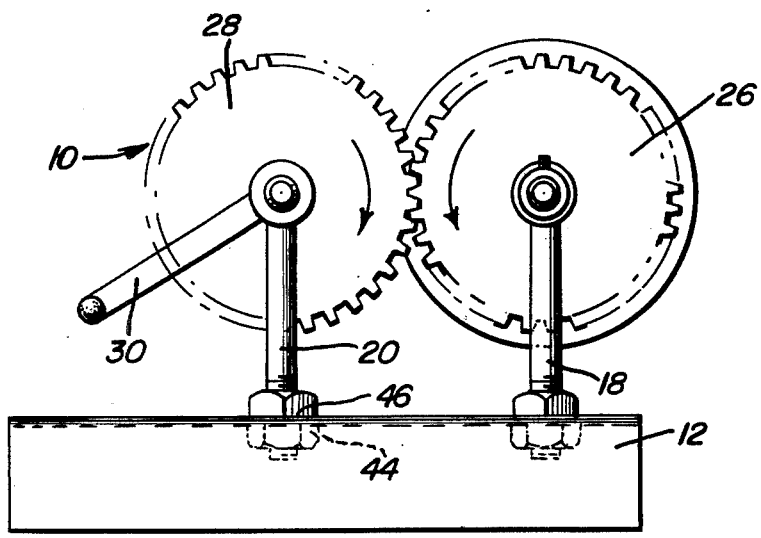
FIG. 4 is an elevational view taken substantially along lines 4—4 of FIG. 1.

The second shaft 16 is seen to have a handle 30 attached to one end thereof, the handle 30 being used to manually rotate the second shaft 16. It is to be understood that motorized apparatus could be employed to rotate the second shaft 16 at a desired rotational speed. Rotation of the second shaft 16 not only causes rotation of the convex roller member 24 in a clockwise sense as seen in FIG. 4, but also causes rotation of the spur gear 28. The first and second shafts 14 and 16 are mounted on the base 12 in spaced parallel relation, the shafts 14 and 16 being spaced from each other at a distance sufficient to allow meshing of the spur gears 26 and 28 as seen in FIG. 4. Accordingly, rotation of the spur gear 28 in a clockwise sense causes rotation of the spur gear 26 and thus the concave roller member 24 and the first shaft 14 in a counterclockwise sense. Accordingly, rotation of the second shaft 16, such as by operation of the handle 30, causes the first shaft 14 to rotate in an angular sense opposite to the rotation of said second shaft 16. In this manner, the concave and convex roller members 22 and 24 move in counter-rotating relationship to each other to peel the deheaded crawfish 38 by pulling the tail shell 40 thereof between concave and convex surfaces 32 and 34 as aforesaid.

As can particularly be seen in FIGS. 1 and 5, the spacing 36 is chosen to be a finite distance which is dependent upon the dimensions of the crawfish or other crustacean which is to be peeled by the apparatus 10. The spacing 36 is chosen to be a distance which will grasp or contact opposite surfaces of the rear margins of the tail shell 40 of the deheaded crawfish 38 and pull said tail shell therebetween. The spacing 36 is not, however, of a sufficient distance to allow the edible tail portion 42 of the crawfish 38 to be pulled between the roller members 22 and 24. A suitable spacing 36 can vary from a substantially zero clearance gap to a gap of over ⅛ inch. For crawfish of typical size, the spacing 36 is typically of a dimensions of approximately 1/32nd inch. As can be particularly seen in FIG. 1, the spacing 36 between the surfaces 32 and 34 is constant about the respective perpheries of the surfaces 32 and 34. According to a further teaching of the invention, the shape of the concave surface 32 and the convex surface 34 is substantially semi-circular in cross section, the shape essentially being congruent with a section taken through the deheaded crawfish 38 perpendicularly to the longitudinal axis thereof. Shaping of the surfaces 32 and 34 to substantially conform to the cross-sectional shape of the deheaded crawfish 38 further acts to prevent passage of the edible tail portion 42 between the roller members 22 and 24, such passage causing mutilation of the edible tail portion 42 and thereby the economic losses associated with such mutilation. It is further to be understood that the supports 18 and 20 can be moved relative to each other in order to vary the spacing at 36. Particularly, nuts 44 seen particularly in FIGS. 2 and 3 can be loosened and either the supports 18 or 20 move relative to the other supports within suitable apertures 46 formed in the base 12 as seen in FIG. 4.

When using the present invention, a substantial saving is made in energy use as compared to conventional techniques which have been used commercially and which require boiling or partial cooking of the crawfish before peeling. The present invention is particularly useful in peeling crawfish tails in their raw or uncooked state thus reducing energy requirements. The peeling of the crawfish tails while in their uncooked state also materially increases the shelf life of the resultant packaged product. Further, since it is only necessary to store the crawfish tails rather than the complete crawfish, the use of the present peeler enables reduction in the storage space necessary and reduction in handling equipment required to provide an adequate supply of crawfish tails for operation of the peeler.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for separating exoskeletal portions of a crawfish or similar crustacean from edible tail portions thereof, comprising:
   a first roller member having a concave peripheral edge surface;
   a second roller member having a convex peripheral edge surface;
   means for mounting the first and second roller members for counterrotational movement and in spaced relation relative to each other, the convex peripheral edge of the second roller member extending into and being disposed within the concavity formed by the concave peripheral edge surface of the first roller member; and
   means for rotating the first and second roller members at substantially the same peripheral speed, whereby the extension of the convex peripheral edge of the second roller member in the concavity of the first roller member will engage and perform a squeezing operation on a crustacean introduced therebetween to squeeze the edible tail portions from the exoskeletal portions thereof independent of a rubbing or pulling operation.

2. The apparatus of claim 1 wherein the concave peripheral edge surface of the first roller member and the convex peripheral edge surface of the second roller member are disposed at a constant spacing relative to each other laterally of the roller members.

3. The apparatus of claim 1 wherein the concave peripheral edge surface of the first roller member and the convex peripheral edge surface of the second roller member are shaped in cross section congruently with the shape of a section taken normally to the longitudinal axis of a crawfish through the tail portion.

4. The apparatus of claim 1 wherein the concave peripheral edge surface of the first roller member and the convex peripheral edge surface of the second roller member are shaped semi-circularly in cross section.

5. The apparatus of claim 1 wherein the mounting means comprise:
   a base member;
   first and second rotary shafts respectively mounting the first and second roller members;
   support members connected to the base member and mounting the first and second roller members for rotational movement; and,
   a spur gear mounted for rotation with each of the first and second roller members, the spur gears mating to cause rotation of one of the shafts in an opposite sense to the other shaft on rotation of the other shaft.

6. The apparatus of claim 5 wherein the last-mentioned means comprises a handle mounted to one of the shafts for manual rotation thereof.

7. The apparatus of claim 1 and further comprising means for varying the spacing between the concave peripheral edge surface of the first roller member and the convex peripheral edge surface of the second roller member.

* * * * *